United States Patent

Ren et al.

(10) Patent No.: US 6,727,610 B2
(45) Date of Patent: Apr. 27, 2004

(54) GENERATOR HAVING FLANGE BAFFLE AND METHOD FOR CONTROLLING VENTILATION FLOW

(75) Inventors: Wei-Min Ren, Niskayuna, NY (US); Mohamed Ezz Osama, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/063,966

(22) Filed: May 30, 2002

(65) Prior Publication Data

US 2003/0222517 A1 Dec. 4, 2003

(51) Int. Cl.[7] .................................................. H02K 9/00
(52) U.S. Cl. .............................. 310/53; 310/55; 310/58
(58) Field of Search .............................. 310/52, 53, 54, 310/55, 58, 59, 62, 63, 260

(56) References Cited

U.S. PATENT DOCUMENTS

| 3,413,499 | A | * | 11/1968 | Barton ......................... 310/58 |
|---|---|---|---|---|
| 3,739,208 | A | * | 6/1973 | Shartrand ..................... 310/58 |
| 3,969,643 | A | * | 7/1976 | Sapper .......................... 310/53 |
| 4,039,872 | A | | 8/1977 | Armor et al. .................. 310/62 |
| 4,051,400 | A | * | 9/1977 | Armor et al. .................. 310/58 |
| 4,208,597 | A | * | 6/1980 | Mulach et al. ................ 310/59 |
| 4,324,993 | A | * | 4/1982 | Sato et al. ..................... 310/58 |
| 4,609,840 | A | | 9/1986 | Eats et al. ..................... 310/58 |
| 4,682,064 | A | | 7/1987 | Crounse et al. ............... 310/61 |

OTHER PUBLICATIONS

Chyu, M.K. et al.;, *Concavity Enhanced Heat Transfer in an Internal Cooling Passage*, Paper No. 437; Paper/American Society of Mechanical Engineers Proceedings of the 1997 International Gas Turbine and Aeroengine Congress and Exhibition, Orlando, Florida, Jun. 2–5, 1997.

* cited by examiner

*Primary Examiner*—Dang Le
(74) *Attorney, Agent, or Firm*—Nixon & Vanderhye PC

(57) ABSTRACT

In an electromagnetic generator with a reverse-flow ventilation scheme, a baffle structure is provided to guide the outside space block cooling gas all the way to the stator core inner diameter. The baffle structure helps cool the first package by preventing hot air recirculations that conventionally occur at the tip of the flange and next to the first tooth.

19 Claims, 3 Drawing Sheets

GENERATOR HAVING FLANGE BAFFLE AND METHOD FOR CONTROLLING VENTILATION FLOW

BACKGROUND OF INVENTION

The present invention relates to generator cooling and, more particularly, to a baffle plate for guiding cooling gas and improving end-core ventilation.

During the process of producing electricity, power generators also create heat that must be dissipated away from the generator. Generators are typically gas-cooled by ventilated cooling systems that circulate cooling gas through ducts in the rotor and stator. By way of example, FIG. 1 schematically shows a partial cross-section of a generator having a reverse flow ventilation scheme. In the schematic illustration of FIG. 1, the rotor is generally shown at 10. The generator stator core 12 is constructed by stacking many layers of magnetic laminations. Ventilating ducts are defined between the stacked layers of magnetic laminations by providing spacers in the core stack. This allows for the passage of cooling gas through the core during operation. These spacers must be positioned in such a way to ensure tightness of the core during assembly and operation, but must not block or restrict the flow of gas through the stator. Outside space blocks 14 are located at the ends of the generator stator core, between the stacked laminations 16 and the stator flange 18, as schematically shown by dashed lines next to the flange 18 in FIG. 1. As illustrated, the cooling gas flow through the ventilation ducts between the stacked layers of laminations of the stator flows into the rotor-stator gap 20 to define a rotor-stator gap flow 22.

Cooling is one of the major challenges in conventional air-cooled generator designs as the rating of the machine is continuously increased. Analysis shows that extra eddy current losses in the end core of the machine are concentrated in the first package. In this regard, FIG. 1 illustrates the conventional air flow distribution in the region of the flange and the first package. As illustrated, air recirculation 24 has been observed in the region next to the first tooth 26 so that the first package 28 is not effectively cooled. The tooth temperature rise, as a result of the eddy current losses, often results in the hottest resistance temperature detector (RTD) temperature at the core end. Thus, it would be highly desirable to more effectively cool the first package 28 and flange 18 to improve the overall ventilation performance of the machine.

SUMMARY OF INVENTION

In an embodiment of the invention, a baffle is provided to guide the outside space block cooling gas all the way to the stator core inner diameter. The baffle provides a cost-effective method to effectively cool the first package by preventing hot air recirculations that conventionally occur at the tip of the flange and next to the first tooth. The baffle will also improve the heat transfer between the cooling gas and flange.

Thus, the invention is embodied in an electromagnetic generator comprising a stator structure concentrically disposed to a rotor structure, said stator structure having a radially outer surface and a radially inner surface, and including stacked laminations and an end flange component mounted to at least one axial end of said stacked laminations; a plurality of space blocks mounted between said stacked laminations and said end flange component, said space blocks being circumferentially spaced and extending radially to define a plurality of radial flow passages therebetween; and a baffle plate secured to said end flange component to extend radially inwardly from said end flange component substantially to said stator structure radially inner surface, a radially inner edge of said baffle plate including a plurality of slots for receiving copper end turns of said stator structure, whereby cooling air flowing between said stacked laminations and said end flange is directed substantially to said radially inner surface of said stator flange.

The invention may also be embodied in a method for controlling ventilation flow in a generator comprising providing a stator structure concentrically disposed to a rotor structure, said stator structure having a radially outer surface and a radially inner surface, and including stacked laminations and an end flange component mounted to at least one axial end of said stacked laminations, a plurality of space blocks being mounted between said stacked laminations and said end flange component, said space blocks being circumferentially spaced and extending radially to define a plurality of radial flow passages therebetween; providing a baffle plate structure; securing said baffle plate structure to said end flange component so as to extend radially inwardly from said end flange component substantially to said stator structure radially inner surface, a radially inner edge of said baffle plate including a plurality of slots for receiving copper end turns of said stator structure; and directing cooling air to flow between the stacked laminations and the end flange component and guiding the cooling air with said baffle plate to cool a radially inner portion of a first said lamination.

BRIEF DESCRIPTION OF DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION

Figure 2:
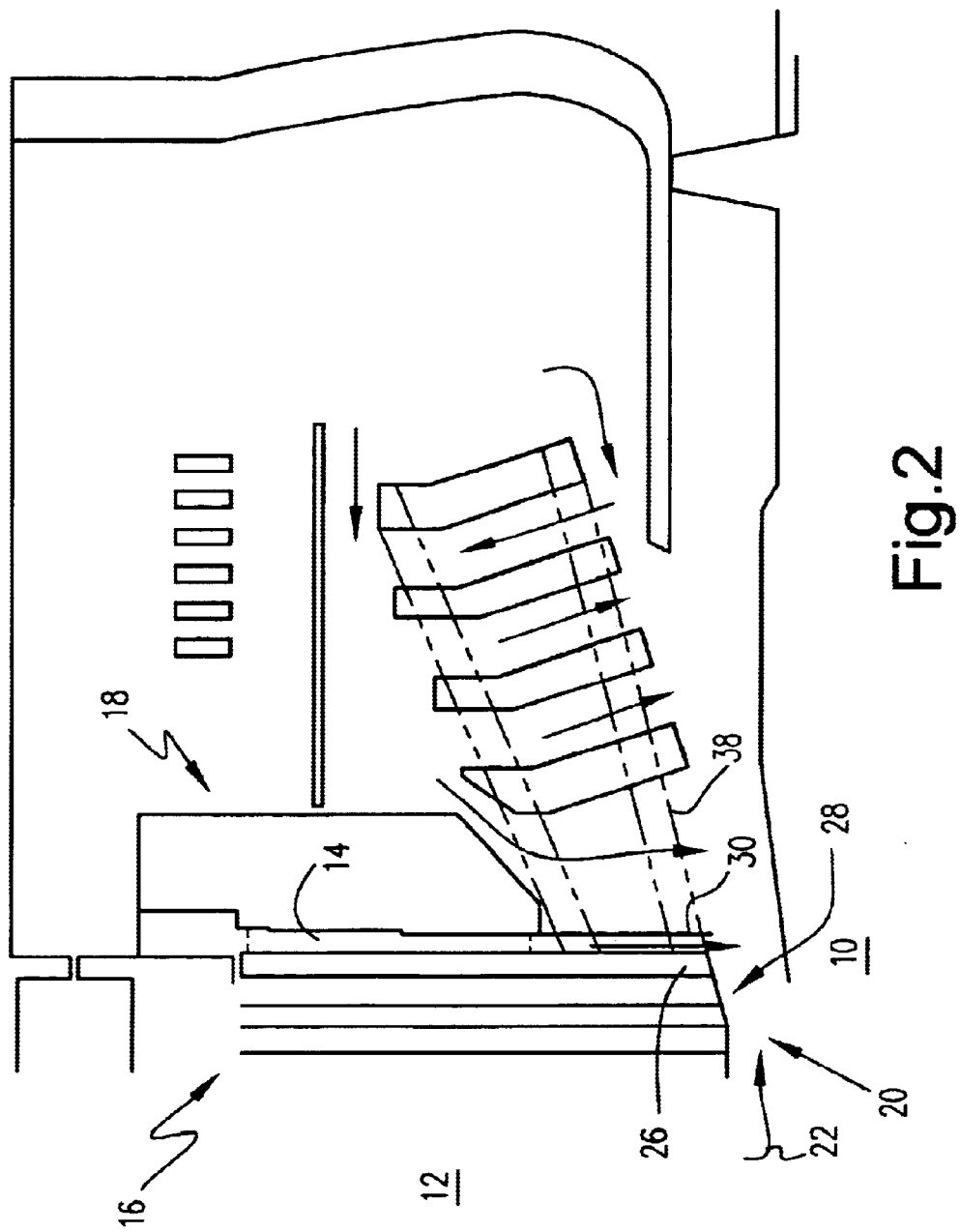
FIG. 2 is a schematic cross-sectional view showing an air flow distribution at the generator end-core region when a baffle is mounted to the flange in an embodiment of the invention.
Figure 3:
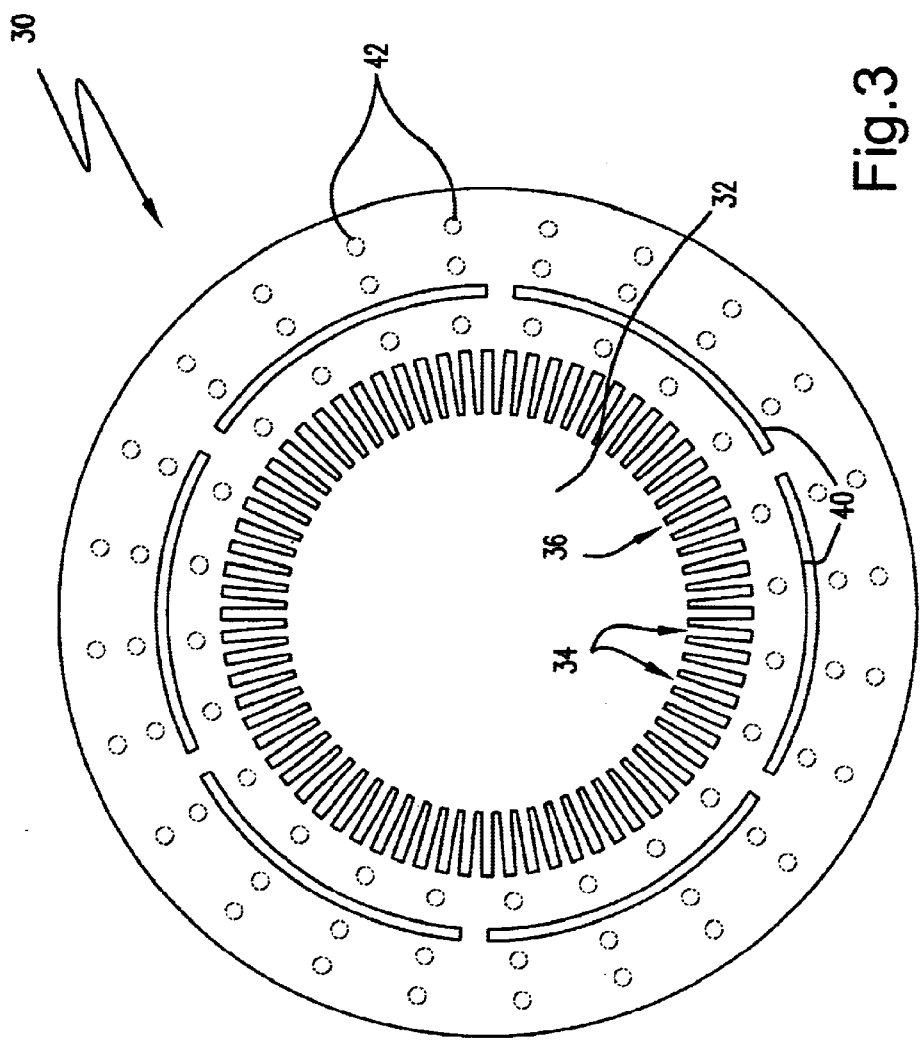
FIG. 3 is an elevational view of an exemplary baffle provided as an embodiment of the invention.

With reference to FIGS. 2 and 3, a flange baffle structure 30 is proposed to overcome the disadvantages of reverse flow and hot air recirculation 24 in the region next to the first tooth 26 in the generator end-core region. An assembly of the baffle structure 30 to the stator is schematically shown in FIG. 2. As illustrated, the baffle structure 30 guides the outside space block cooling gas all the way to the stator core inner diameter. This effectively eliminates hot-air recirculation so that the outside space block cooling air can effectively cool the first package 28.

In one embodiment, the baffle structure may be provided as a symmetrically configured plate 30 for being secured between the outside space blocks 14 and the stator end flange 18. Thus, as shown in FIG. 3, in the illustrated embodiment, the baffle plate 30 has an opening 32 defined centrally therethrough for accommodating the rotor and a plurality of radial slots or cut-outs 34 defined about its inner periphery 36 for passage of the copper bar windings 38. The number of slots 34 may of course vary from machine to machine and thus the slots are disposed so as to correspond to the number and location of copper bar windings 38.

In the illustrated embodiment, furthermore, a plurality of part-circumferential or annular slots 40 are further provided, radially outside the radial slots 34, to expose the flange 18 to the cooling gas passing between the outside space blocks 14. Six annular slots 40 are provided in the illustrated embodiment. The annular slots are positioned so that the cooling gas will impinge on the axial surface of the flange 18 to enhance heat removal. The number, location, size and shape of the cooling slots 40 may be varied as deemed necessary or desirable but they are preferably symmetrically disposed for uniform cooling effects.

The baffle plate 30 is advantageously formed from a non-magnetic material to avoid creating low reluctance flux paths. However, the material is also advantageously selected for good thermal conductance such that the baffle may function as a fin to improve heat exchange between the cooling gas and the stator flange. Furthermore, the electrical resistance should not be too low to limit eddy current magnitude. In this regard, an exemplary material for the baffle plate component is stainless steel.

The baffle 30 is also of limited thickness to minimize the volume available for induced eddy current losses, but sufficient for mechanical strength and rigidity. An exemplary thickness of the baffle plate is 2 mm.

Finally, the baffle surface facing the cooling gas flow between the outside space blocks may be smooth or can have surface manifestations, such as grooves or dimples as schematically shown at 42, to promote localized flow turbulence to thus improve the heat transfer coefficient for improved cooling.

Figure 1:
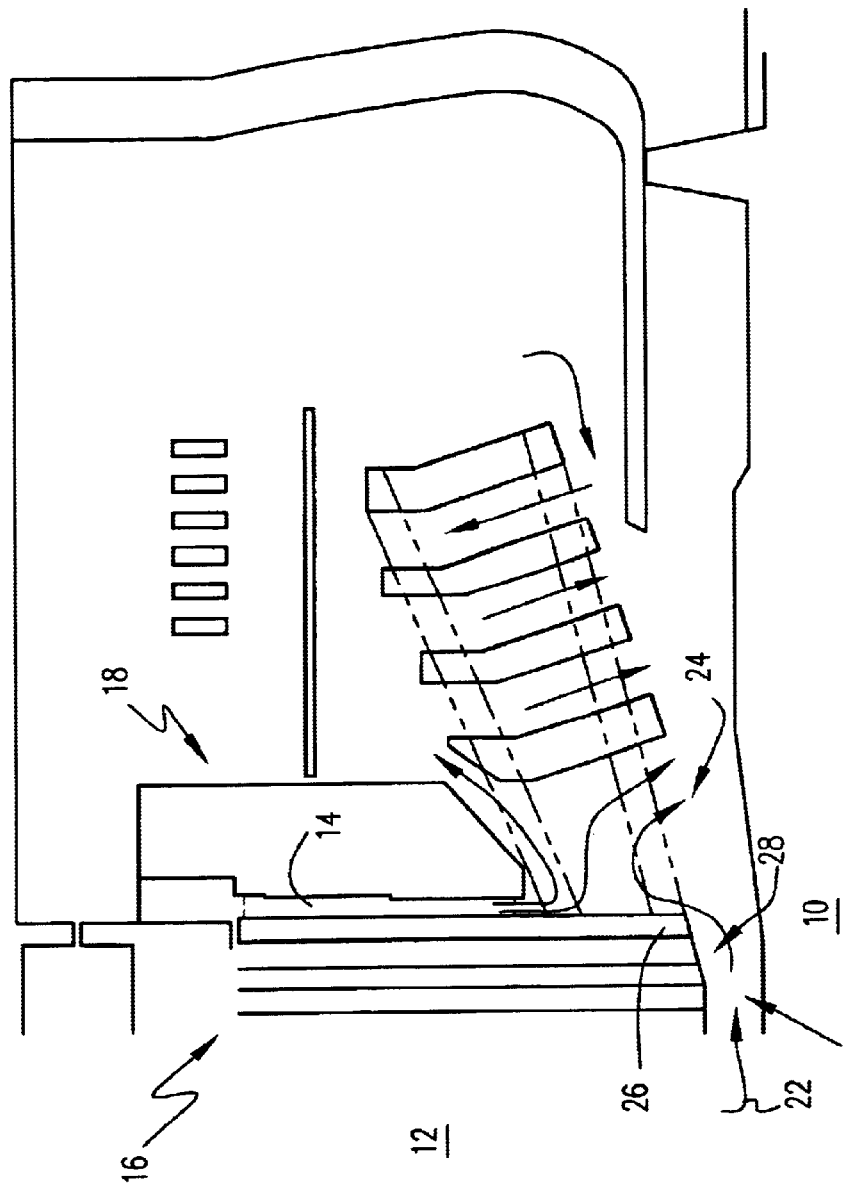
FIG. 1 is a schematic cross-sectional view showing the conventional air flow distribution in the end core of a conventional air-cooled generator design.

Fluid dynamics analyses have revealed that a more uniform flow distribution will result by adding the baffle 30 to an otherwise conventional generator structure as schematically depicted in FIGS. 1 and 2. Furthermore, adding the baffle serves to eliminate hot-air recirculation 24 and will provide, according to the analysis, a reduction in the first package 28 temperature of about 14 degrees Celcius. The baffle will also improve the heat transfer between the cooling gas and flange. As a result, the flux shield can be eliminated in certain applications. This temperature reduction and the indicated improved cooling gas distributions are expected to provide for better overall performance.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An electromagnetic generator comprising:
    a stator structure concentrically disposed to a rotor structure, said stator structure having a radially outer surface and a radially inner surface, and including stacked laminations and an end flange component mounted to at least one axial end of said stacked laminations;
    a plurality of space blocks mounted between said stacked laminations and said end flange component, said space blocks being circumferentially spaced and extending radially to define a plurality of radial flow passages therebetween; and
    a generally planar baffle plate secured to said end flange component to extend radially inwardly from said end flange component substantially to said stator structure radially inner surface, said baffle plate including a plurality of radial slots for receiving copper end turns of said stator structure, whereby cooling air flowing radially inwardly between said stacked laminations and said end flange is directed substantially to said radially inner surface of said stator structure.

2. An electromagnetic generator as in claim 1, wherein said baffle plate is generally disk-shaped having a centrally defined opening for accommodating the rotor structure, said plurality of radial slots extending from an inner peripheral edge of said baffle plate defined by said central opening.

3. An electromagnetic generator as in claim 2, wherein a surface of said baffle plate facing the cooling gas flow between the space blocks has surface manifestations to promote localized flow turbulence for improving the heat transfer coefficient for improved cooling.

4. An electromagnetic generator as in claim 3, wherein said surface manifestations are one of grooves and dimples.

5. An electromagnetic generator as in claim 1, wherein said baffle plate is secured between said space blocks and said end flange component.

6. An electromagnetic generator as in claim 1, wherein said baffle plate further includes a plurality of annular slots, said slots extending part circumferentially and being defined radially outside said radial slots.

7. An electromagnetic generator as in claim 6, wherein said annular slots are disposed to overlap said end flange structure thereby to define access for cooling flow to said end flange component axial surface.

8. An electromagnetic generator as in claim 1, wherein said baffle plate is formed from a non-magnetic material.

9. An electromagnetic generator as in claim 1, wherein said baffle plate component is formed from stainless steel.

10. An electromagnetic generator as in claim 1, wherein said baffle plate has a thickness of about 2 mm.

11. A method for controlling ventilation flow in a generator having a reverse flow ventilation scheme, comprising:
    providing a stator structure concentrically disposed to a rotor structure, said stator structure having a radially outer surface and a radially inner surface, and including stacked laminations and an end flange component mounted to at least one axial end of said stacked laminations, a plurality of space blocks being mounted between said stacked laminations and said end flange component, said space blocks being circumferentially spaced and extending radially to define a plurality of radial flow passages therebetween;
    providing a baffle plate structure;
    securing said baffle plate structure to said end flange component so as to extend radially inwardly from said end flange component substantially to said stator structure radially inner surface, a radially inner edge of said baffle plate including a plurality of slots for receiving copper end turns of said stator structure; and
    directing cooling air to flow radially inwardly through the stator structure and radially inwardly between the stacked laminations and the end flange component and guiding the cooling air with said baffle plate to cool a radially inner portion of a first said lamination.

12. A method as in claim 11, wherein said providing a baffle plate structure comprises providing a generally disk-shaped baffle plate structure having a centrally defined opening for accommodating the rotor structure, and wherein said plurality of radial slots extend from an inner peripheral edge of said baffle plate defined by said central opening.

13. A method as in claim 11, wherein said securing comprises securing said baffle plate structure between said space blocks and said end flange component.

14. A method as in claim 11, wherein said providing a baffle plate structure comprises providing a baffle plate structure having a plurality of annular slots, said slots extending part circumferentially and being defined radially outside said radial slots, and further comprising impinging cooling flow on an axial surface of said end flange component through said annular slots.

15. A method as in claim 11, wherein said providing a baffle plate structure comprises providing a baffle plate structure having a surface for facing the cooling gas flow between the space blocks that has surface manifestations to promote localized flow turbulence for improving the heat transfer coefficient for improved cooling.

16. A method as in claim 15, wherein said surface manifestations are one of grooves and dimples.

17. A method as in claim 11, wherein said providing a baffle plate structure comprises providing a generally planar baffle plate structure.

18. An electromagnetic generator comprising:
- a stator structure concentrically disposed to a rotor structure, said stator structure having a radially outer surface and a radially inner surface, and including stacked laminations and an end flange component mounted to at least one axial end of said stacked laminations;
- a plurality of space blocks mounted between said stacked laminations and said end flange component, said space blocks being circumferentially spaced and extending radially to define a plurality of radial flow passages therebetween; and
- a baffle plate secured to said end flange component to extend radially inwardly from said end flange component substantially to said stator structure radially inner surface, said baffle plate including a plurality of radial slots for receiving copper end turns of said stator structure, whereby cooling air flowing between said stacked laminations and said end flange is directed substantially to said radially inner surface of said stator structure,
- wherein said baffle plate further includes a plurality of annular slots, said slots extending part circumferentially and being defined radially outside said radial slots.

19. An electromagnetic generator as in claim 18, wherein said annular slots are disposed to overlap said end flange structure thereby to define access for cooling flow to said end flange component axial surface.

* * * * *